United States Patent
Dhara et al.

(10) Patent No.: US 7,180,991 B2
(45) Date of Patent: Feb. 20, 2007

(54) DYNAMIC, INTERACTIVE CALL NOTIFICATION

(75) Inventors: Krishna Kishore Dhara, Parlin, NJ (US); David Joseph Skiba, Columbus, OH (US)

(73) Assignee: Avaya Technology Corp., Basking Ridge, NJ (US)

(*) Notice: Subject to any disclaimer, the term of this patent is extended or adjusted under 35 U.S.C. 154(b) by 509 days.

(21) Appl. No.: 10/190,629

(22) Filed: Jul. 8, 2002

(65) Prior Publication Data

US 2004/0005042 A1    Jan. 8, 2004

(51) Int. Cl.
H04M 1/56    (2006.01)
H04M 15/06   (2006.01)
H04M 3/42    (2006.01)
H04M 1/64    (2006.01)

(52) U.S. Cl. .................. 379/142.01; 379/142.06; 379/214.01; 379/88.12

(58) Field of Classification Search .......... 379/142.01, 379/142.04, 142.05, 142.06, 142.07, 142.14, 379/142.15, 142.17, 201.04, 201.1, 207.15, 379/210.01, 211.01, 213.01, 214.01, 67.01, 379/70, 88.01, 88.11, 88.12; 709/102, 315, 709/313, 318

See application file for complete search history.

(56) References Cited

U.S. PATENT DOCUMENTS

| | | | | |
|---|---|---|---|---|
| 5,327,486 A | * | 7/1994 | Wolff et al. ............... | 379/93.23 |
| 5,388,150 A | * | 2/1995 | Schneyer et al. ........ | 379/88.19 |
| 5,592,534 A | * | 1/1997 | Ito ........................... | 455/435.1 |
| 5,600,710 A | * | 2/1997 | Weisser et al. .......... | 379/88.19 |
| 5,751,800 A | * | 5/1998 | Ardon ....................... | 379/134 |
| 5,963,626 A | * | 10/1999 | Nabkel ................... | 379/142.01 |
| 6,041,103 A | * | 3/2000 | La Porta et al. .......... | 379/67.1 |
| 6,064,732 A | * | 5/2000 | Pezzullo et al. ........... | 379/396 |
| 6,160,877 A | * | 12/2000 | Tatchell et al. ............. | 379/197 |
| 6,438,216 B1 | * | 8/2002 | Aktas ...................... | 379/88.01 |
| 6,456,706 B1 | * | 9/2002 | Blood et al. ................ | 379/188 |
| 6,459,780 B1 | * | 10/2002 | Wurster et al. ........ | 379/142.02 |
| 6,704,395 B1 | * | 3/2004 | Borland et al. ............ | 379/67.1 |
| 6,724,872 B1 | * | 4/2004 | Moore et al. ............ | 379/93.35 |
| 6,798,873 B2 | * | 9/2004 | Vardi et al. ............ | 379/201.01 |
| 2002/0118807 A1 | * | 8/2002 | Pedersen ............... | 379/142.01 |
| 2005/0053221 A1 | * | 3/2005 | Reding et al. .......... | 379/211.02 |

FOREIGN PATENT DOCUMENTS

WO      WO 96/19066      * 6/1996

* cited by examiner

*Primary Examiner*—Quoc Tran
(74) *Attorney, Agent, or Firm*—DeMont & Breyer, LLP

(57) ABSTRACT

A system and method that provides a dialog with the called party when a call is received, a process is initiated to communicate with the calling party and a process is initiated to communicate with the called party. The processes communicate with each other to provide limited communication between the called and calling parties without an actual connection being made between them. The called party process determines disposition of the call based on the caller ID of the calling party and the state of the called party telephone. Advantageously, the called party process prompts the called party as to how to handle the call. The called party can request further information regarding the person calling, the purpose of the call, etc., without a connection being made to the calling party.

19 Claims, 4 Drawing Sheets

DYNAMIC, INTERACTIVE CALL NOTIFICATION

FIELD OF THE INVENTION

This invention relates to the field of telephony and, more specifically, to a system and method for notifying a called party of an incoming call by providing call-specific information to the called party interactively and providing the called party the ability to direct disposition of the call dynamically without establishing a connection between the calling and the called party.

BACKGROUND OF THE INVENTION

Currently, a called party is notified of an incoming call in a manner that has remained the same for over one hundred years: the telephone "rings". Ringing signals may have changed from the ringing of copper bells to electronic simulations thereof, flashing lights and other forms of audible and/or visible signals (e.g., musical melodies, text messages on a display on or adjacent the telephone, synthesized or recorded speech, etc.) but the meaning is the same. Regardless of whether a bell rings, a light flashes or a melody plays, the called party knows that he or she has an incoming call.

The only additional information regarding the incoming call that is available is caller identification ("caller ID"), which is usually the telephone number of the calling telephone and, optionally, the name of the person associated with the calling telephone. Frequently, however, the caller ID is blocked, or the person calling is not the one whose name and/or telephone number appears in the caller ID. The called party has to answer the call to find out more.

Thus, when the phone rings, the called party must make a decision as to how to (and whether to) answer the call based on the caller ID information. Currently, the called party has two choices: to not answer the call and allow the call to go to no-answer treatment (e.g., voice mail, telephone coverage, etc.) or to answer the call. Once the called party answers the call, the call is connected through the network and nothing further can be done without direct interaction with the calling party. As a result, network resources are consumed, multiple calls may be required and the called party's privacy is compromised.

SUMMARY OF THE INVENTION

This problem is solved and a technical advance is achieved in the art by a system and method, herein called a "script," that gathers information, including the called and calling telephone numbers and, advantageously, the state of the called telephone, applies the information to user-defined preferences and performs user-defined actions. These actions include, but are not limited to, disposing of the call, sending a message to the calling party, seeking additional input from the calling party and/or seeking additional information from the called party by establishing a dialog with the called party. Importantly, the calling party and the called party are not connected unless and until the called party selects to answer the call.

According to one embodiment of this invention, the called party sets the script to the desired disposition of incoming calls based on the caller, the state of the called party's telephone and, optionally, other parameters. The called party's script is started when an incoming call is received from a calling party. Advantageously, the called party can dynamically change the script as needed (such as when the called party is active on another call). If the script can dispose of the call without input from the called party, then such action is taken and the called party is not made aware of the call. If the called party's input is required, a telephony device notifies the called party with some form of attention signal, and, optionally, the caller ID of the calling party, as in the prior art. Further, the called party's telephony device prompts the called party as to how he or she wishes to handle the call. For example, a menu may be presented that includes such diverse elements as send to voice mail, redirect to a covering party, redirect to another telephone, or, alternatively, simply answering the call.

Advantageously, the called party can request further information regarding the person calling, the purpose of the call, etc., without a connection being made to the calling party. Responses to such inquiries are delivered to the called party. The called party may then make an informed choice as to whether or not to answer the call, send it to voicemail, etc.

According to an exemplary embodiment of this invention, an incoming call is first received at a call control unit, such as a processor adjunct to the telephone system, which "holds" the incoming call whilst a dialog is established with the called party. A process is initiated to communicate with the calling party and a process is initiated to communicate with the called party, which operates according to the called party script. The processes communicate with each other to provide limited communication between the called and calling parties without an actual connection being made between them. In this manner, telecommunications network resources may be more efficiently used and a called party may make the best use of his or her time, while maintaining privacy.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
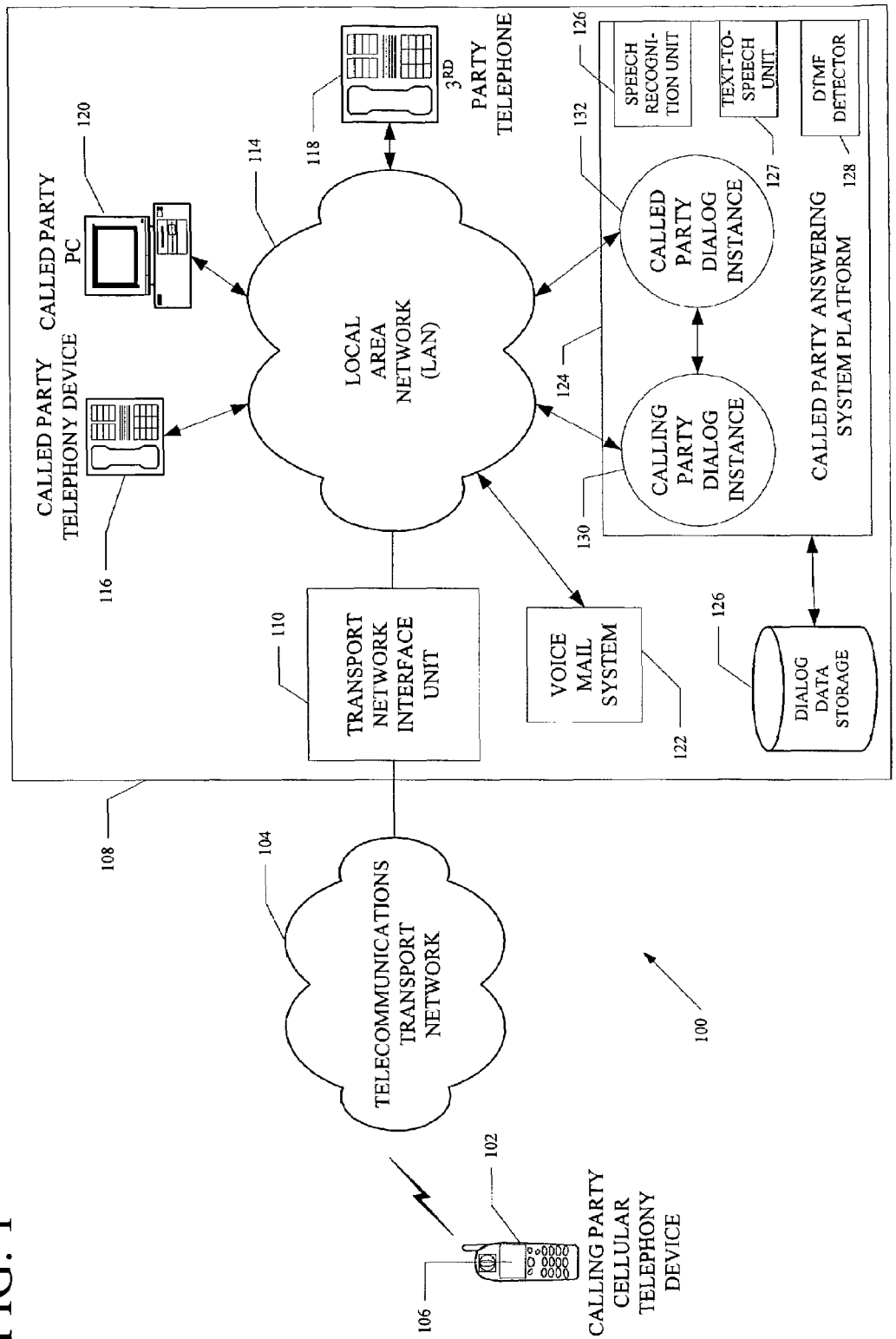
FIG. 1 is a block diagram of an Internet Protocol (IP) telephone network in which an exemplary embodiment of this invention may be implemented.

FIG. 1 is a block diagram of a telecommunications system illustrating an exemplary embodiment of this invention in the context of a telephone network 100. For purposes of describing the various aspects of this invention, a cellular telephone 102 is in communication with a transport network 104, as is known in the art. Cellular telephone 102 includes a display 106 and is short-message-service capable. In this exemplary embodiment, transport network 104 comprises the public switched telephone network (PSTN), as is also well known in the art. Transport network 104 is not so limited, however. Transport network 104 can be a signaling network, pager network, the Internet or a combination of networks.

An Internet Protocol (IP) telephone system 108 is connected to transport network 104 at a transport network interface unit 110. Interface unit 110 translates call signals (voice, data and signaling) between transport network 104 and IP telephone system 108.

In the IP telephony system 108 of FIG. 1, LAN 114 interconnects interface unit 110 to a plurality of telephones, represented by telephones 116 and 118, computers, represented by personal computer (PC) 120, voice mail system 122 and one or more call processing systems, such as call answering system 124. Other call processing systems, such as an outgoing call processing system, an intercom system, etc. may also be present, but are not shown for clarity. Call answering system 124 includes a dialog data storage unit 126 for storing information regarding each telephone's answering dialog script, as will be described further, below.

For the purpose of describing one exemplary embodiment of this invention, the user of telephone 102 (the "calling party") is attempting to call the user of telephone 116 (the "called party"). The calling party at telephone 102 places a call to the called party by entering the telephone number of telephone 116. Transport network 104 processes the call in the usual manner, as is known in the art. The called telephone number is located and the call is routed through transport network 104. The call is delivered to a destination switching system associated with the entered telephone number. In this example, the call is delivered to transport network interface unit 110.

Interface unit 110 receives the call notification along with the called and, in most cases, the calling telephone number. Interface unit 110 notifies called party answering system 124 of an incoming call and delivers the calling and called numbers via LAN 114. For purposes of describing features that may be implemented on this exemplary embodiment of this invention, called party answering system 124 includes a speech recognition unit 126, a text-to-speech unit 127 and a dual-tone, multi-frequency (DTMF) detector 128 (all of which are well known in the art and therefore not further described). According to this exemplary embodiment of this invention, called party answering system 124 spawns a process for each of a calling party dialog 130 and a called party dialog 132 according to data stored in dialog data storage 126. Called party dialog instance 132 then processes the incoming call using the script for called party telephone 116.

In the prior art, the called party dialog instance 132 would cause the called party telephone 116 to ring and display the caller ID of the calling party telephone 102. The called party then decides to answer the call or ignore it based on that information alone. If the calling party answers, a voice path is set up. If the called party does not answer, the call may be redirected to voicemail system 122 or possibly to a third party telephone 118.

According to this exemplary embodiment of this invention, and in contradistinction to the prior art, called party dialog instance 132 retrieves the notification script for telephone 116 from dialog data storage 126. Called party dialog instance 132 performs called party notification based on the script, using the called party telephone number, the calling party telephone number, and, advantageously, the state of the called party devices (i.e., called party telephony device 116 and/or called party PC 120). Such scripts are preprogrammable; prepopulated by the user to perform certain functions based upon the calling telephone number and the state of the called party telephony device 116. In this exemplary embodiment, the scripting language comprises Voice XML. Further, the script may be changed dynamically by the called party; the called party may change the script to meet a current situation (i.e., do not disturb except for certain telephone numbers during a conference call). Further, a script may be changed by an application; the script may be changed based on "presence information" of the called party.

According to this exemplary embodiment, called party dialog instance 132 is illustrated as operating on called party answering system platform 124. Called party dialog instance 132 may run in called party telephony device 116, called party PC 120, or a combination of the above. If called party dialog instance 132 is operating in telephony device 116, then obtaining the status of the telephony device and dynamic control of the called party dialog instance 132 is facilitated. One skilled in the art will appreciate that the operation of called party dialog instance 132 is not dependent upon the physical platform.

Three examples of simple scripts are presented hereinafter. These examples are to illustrate clearly an exemplary embodiment of this invention and not to limit the scope of the appended claims. It will be clear to one skilled in the art how to make other, more complex scripts after studying this disclosure.

Continuing from the scenario above, calling party dialog 132 instance receives the called and calling telephone numbers. Calling party dialog instance 132 then checks the state of the called party telephony device 116. In this first example, called party telephony device 116 is busy. Calling party dialog instance 132 then routes the call to voice mail system 122, a third party telephone 118 or take other action depending on the script. For example, the call may be routed to a third party telephone 118 based on the caller ID, time of day, etc. and all other calls routed to voicemail. Further, calling party dialog instance 132 may send a message to called party PC 120 to indicate the fact of the incoming call and the disposition thereof. Additionally, called party dialog instance 132 may send an instant message to calling party cellular telephony device 102 to indicate the called party's busy status, to give an alternative time to call, or to send another message.

In a second example, calling party dialog instance receives the called and calling telephone numbers and determines the status of the calling party telephony device 116. For purposes of this example, called party telephony device 116 is not busy. Alternatively, called party telephony device 116 may be busy but the script indicates that a call with the caller ID of telephone 102 is to interrupt a busy status. Called party dialog instance alerts the called party, which may include playing recorded files or text-to-speech files via text-to-speech unit 127 on telephone 116 (on a speaker, handset, headset, a display screen on telephony device 116 or PC 120, or some combination thereof).

Advantageously, after notification, the called party dialog instance 132 receives input from the called party. The input can be received via speech recognition unit 126, DTMF detector 128 or from the called party's PC 120. Called party dialog 132 responds according to its program. Importantly, called party telephone 116 and calling party telephone 102 are not connected through the telephone network 100. The called party may request further information from the calling party, which is communicated between the called party dialog instance 132 and the calling party dialog instance 130.

The calling party phone 102 may be connected through to the calling party dialog instance 130, depending upon the specifics of the calling party dialog script. For example, the called party may request the name of the calling party. The called party dialog instance 132 receives the request and delivers it to calling party dialog instance 130. Depending on the telephone network 100, calling party dialog instance 130 may request that a connection be made between calling party instance 130 and telephone 102 so that the calling party can speak his or her name or give other identification directly to calling party dialog instance 130. Calling party dialog instance 130 then delivers the recorded speech to called party dialog instance 132, which plays the recorded speech to the called party at telephone 116, transforms the speech into text via text-to-speech unit 127 and delivers the text to PC 120, etc. Thus, the called party can collect enough information to determine whether to and how to respond to the call. The called party can then answer the call (and thus set up a connection directly to calling party telephone 102), send the call to voice mail system 122, to a third party telephone 118, etc.

The above scenario is a simplistic example of the exemplary embodiment of this invention. Of primary importance to this invention are the calling party dialog instance 130 and the called party dialog instance 132 that provide a platform on which many features may be built. The calling party telephone 102 and the called party telephone 116 are not connected to each other until the called party elects to make the connection. According to this exemplary embodiment of this invention, and in contrast to the prior art, the calling and called party can communicate in a limited manner without a complete connection in the telephony sense of the word "connection." The called party can receive (or extract) further information to determine disposition of the call without connecting to the calling party. Thus, the called party's privacy is not compromised while effective communication is enhanced. Further, telecommunications resources are saved, because only minimal telecommunications resources are required to effect the exemplary embodiment of this invention.

Any number of features may be implemented upon the platform of this invention so far described. For example, the called party may verbally direct the call to be routed to voicemail system 122 or to a third party telephone 118.

According to a further embodiment of this invention, a calling party at calling party cell phone 102 may call called party telephone 116. The call is processed through transport network 104 in the usual manner and delivered to PSTN interface unit 110. PSTN interface unit 110 delivers the call (and any associated information) to called party answering system 124. Called party answering system 124 sets up a calling party dialog instance 130 and a called party dialog instance 132. Called party dialog instance 132 informs called party telephone 116 according to scripts as described above.

According to this exemplary embodiment, calling party cell phone 102 includes short message service and a display 106. The called party states a message into called party telephone 116 which is translated to text by ASR unit 126 at called party answering system platform 124. The message is transferred to calling party dialog 130, which is relayed to calling party cell phone 102 and shown on display 104.

Figure 2:
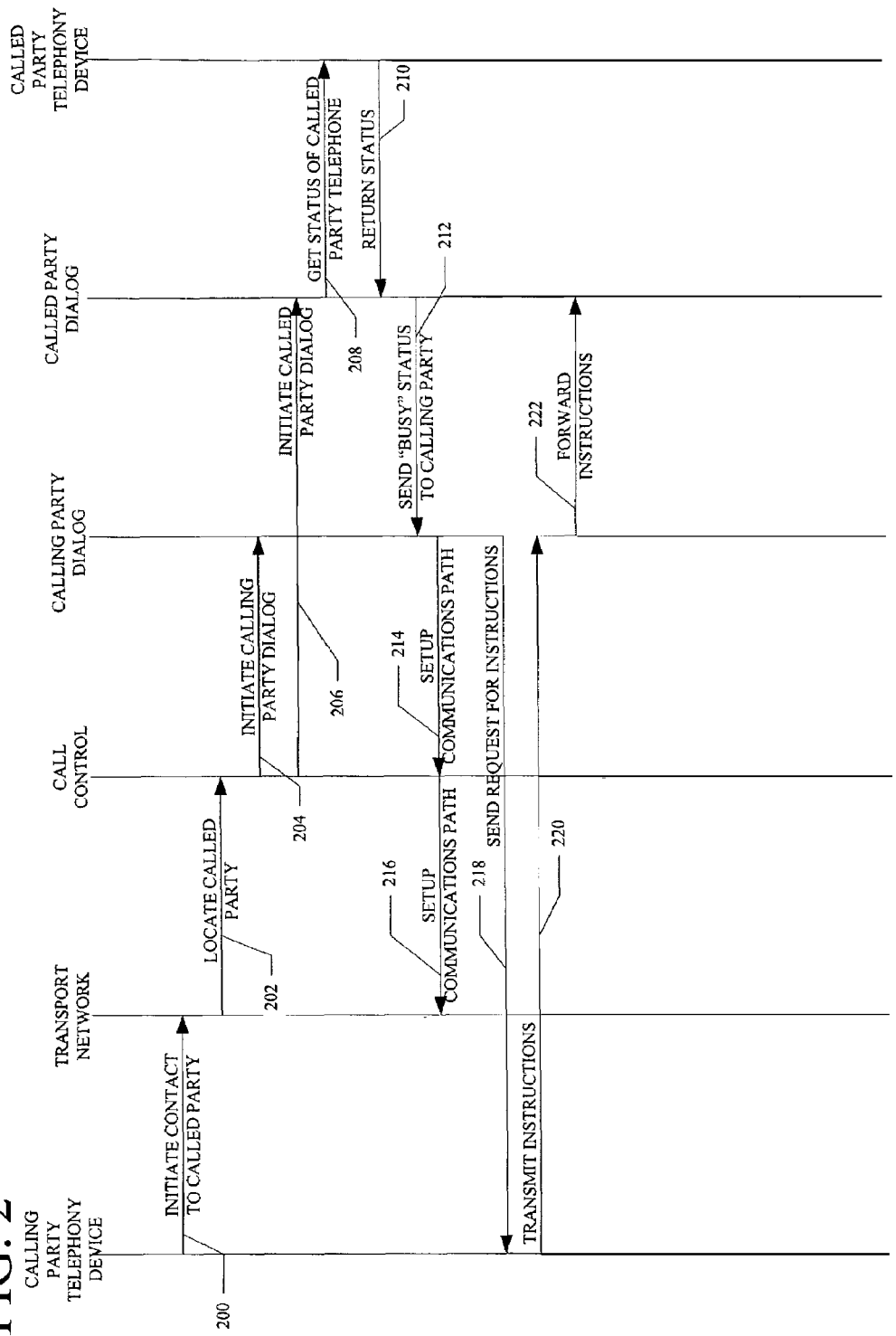
FIG. 2 is an exemplary call flow diagram of the operation of the exemplary embodiment of this invention.

Turning to FIG. 2, a call flow diagram is shown, illustrating the call flow according to a first of the three scenarios presented above. A calling party initiates a call 200 at a calling party telephony device. The calling party telephony device can be a telephone, cell phone, pager, computer, personal digital assistant, etc. The call may be a voice call or a data call (e.g., email, instant message, etc.). The call is delivered to the transport network, which locates the called party 202. The transport network may be the PSTN, a data network, a signaling network, etc., or some combination thereof. The called party is located by telephone number, email address, etc.

The call initiation is passed to the call control device associated with the called party, which initiates a calling party dialog 204 and called party dialog 206. The called party dialog obtains the current status of the called party telephony device 208. The called party telephony device returns its current status (e.g., busy, idle, do not disturb, on hold) to the called party dialog 210. Called party dialog sends a "busy" notification to the calling party dialog 212, in this exemplary call flow.

In this example, the calling party dialog sets up a communication path to the calling party telephone device in order to obtain information regarding disposition of the call. For example, the calling party may be asked whether he or she wants to leave a message, be routed to another telephony device, send a short message, etc. To this end, calling party dialog requests a communication path be set up of the call control device 214. The call control device performs the necessary tasks (depending upon the communications network) and forwards the request to the transport network 216. The transport network sets up a communications path to the calling party telephone device and the calling party dialog sends the request for information to the calling party telephone device 218. This request may be in audible form (either recorded or text-to-speech), may be in short message form, email, etc.

The calling party transmits the information from his or her telephony device 220, which is received at calling party dialog. Calling party dialog forwards the information to the called party dialog 222. Called party dialog disposes of the call according to the instructions.

Figure 3:
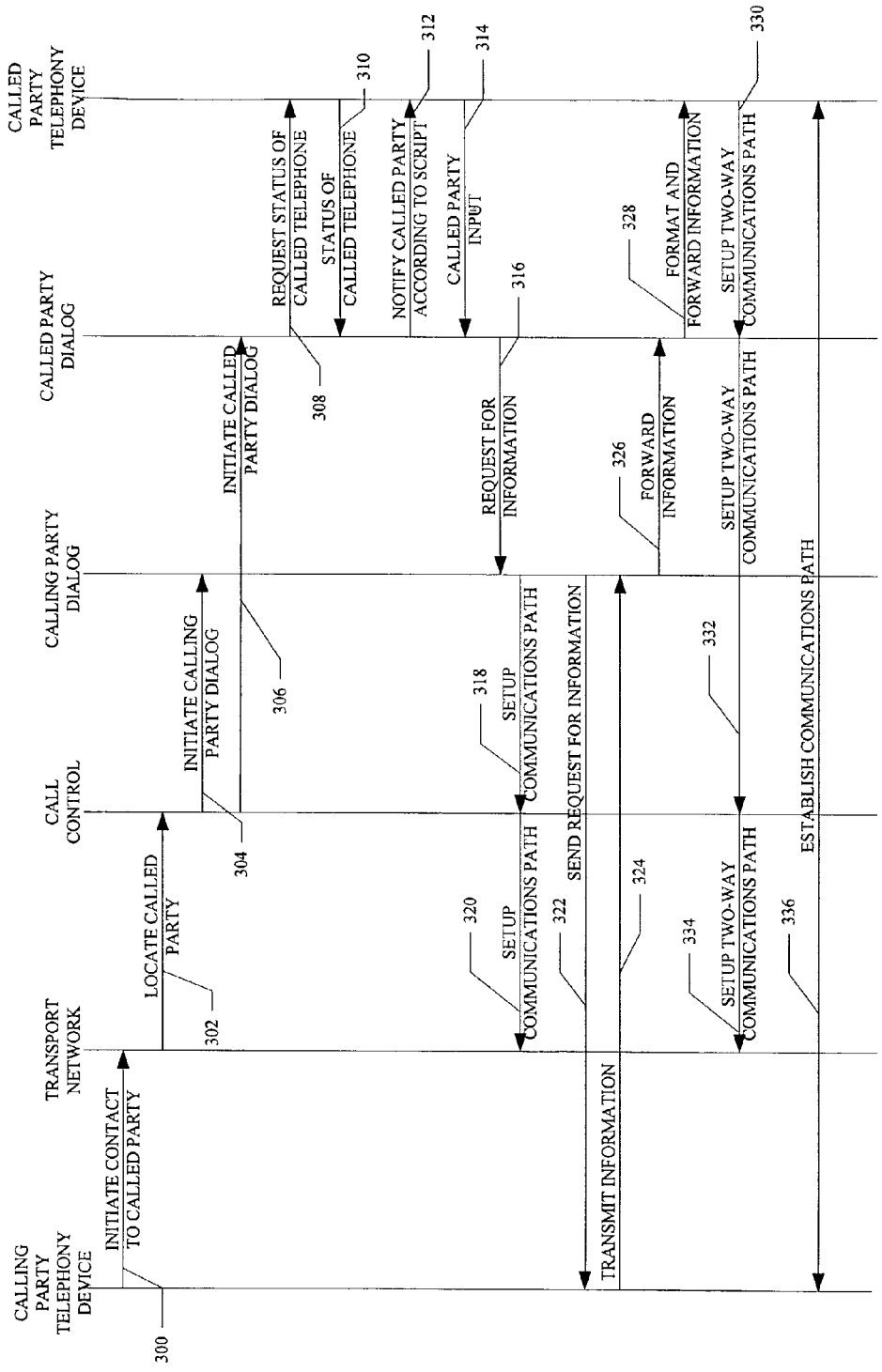
FIG. 3 is another exemplary call flow diagram of the operation of the exemplary embodiment of this invention.

Turning to FIG. 3, a call flow diagram is shown, illustrating the call flow according to the second of the three scenarios presented above. A calling party initiates a call 300 at a calling party telephony device. The call is delivered to the transport network, which locates the called party 302.

The call initiation is passed to the call control device associated with the called party, which initiates a calling party dialog 304 and called party dialog 306. The called party dialog requests the status of the called party telephony device 308, which is delivered in step 310. In this example, the status is "idle". The called party dialog notifies the called party telephony device according to a preprogrammed script 312. The called party provides input to the called party dialog 314. This input may be, in a simplistic example, "what is the name of the calling party?" The called party dialog receives the request, translates the request to usable form (e.g., automatic speech recognition, receiving data from a PC, etc.). The called party dialog passes the request for information to the calling party dialog 316.

In this example, the calling party dialog sets up a communication path to the calling party telephone device in order to obtain this information. To this end, calling party dialog requests a communication path be set up of the call control device 318. The call control device performs the necessary tasks (depending upon the communications network) and forwards the request to the transport network 320. The transport network sets up a communications path to the calling party telephone device and the calling party dialog sends the request for information to the calling party telephone device 322. This request may be in audible form (either recorded or text-to-speech), may be in short message form, email, etc.

The calling party transmits the information from his or her telephony device 324, which is received at calling party dialog. Calling party dialog forwards the information to the called party dialog 326. Called party dialog formats the information according to the calling party script and forwards the information to the called party telephony device 328.

In accordance with this simplistic example, the called party decides to communicate with the calling party. The called party indicates his or her willingness to accept the call to the called party dialog 330. Called party dialog forwards the request to call control 332 and the transport network 334. A full duplex communications path is established 336.

Figure 4:
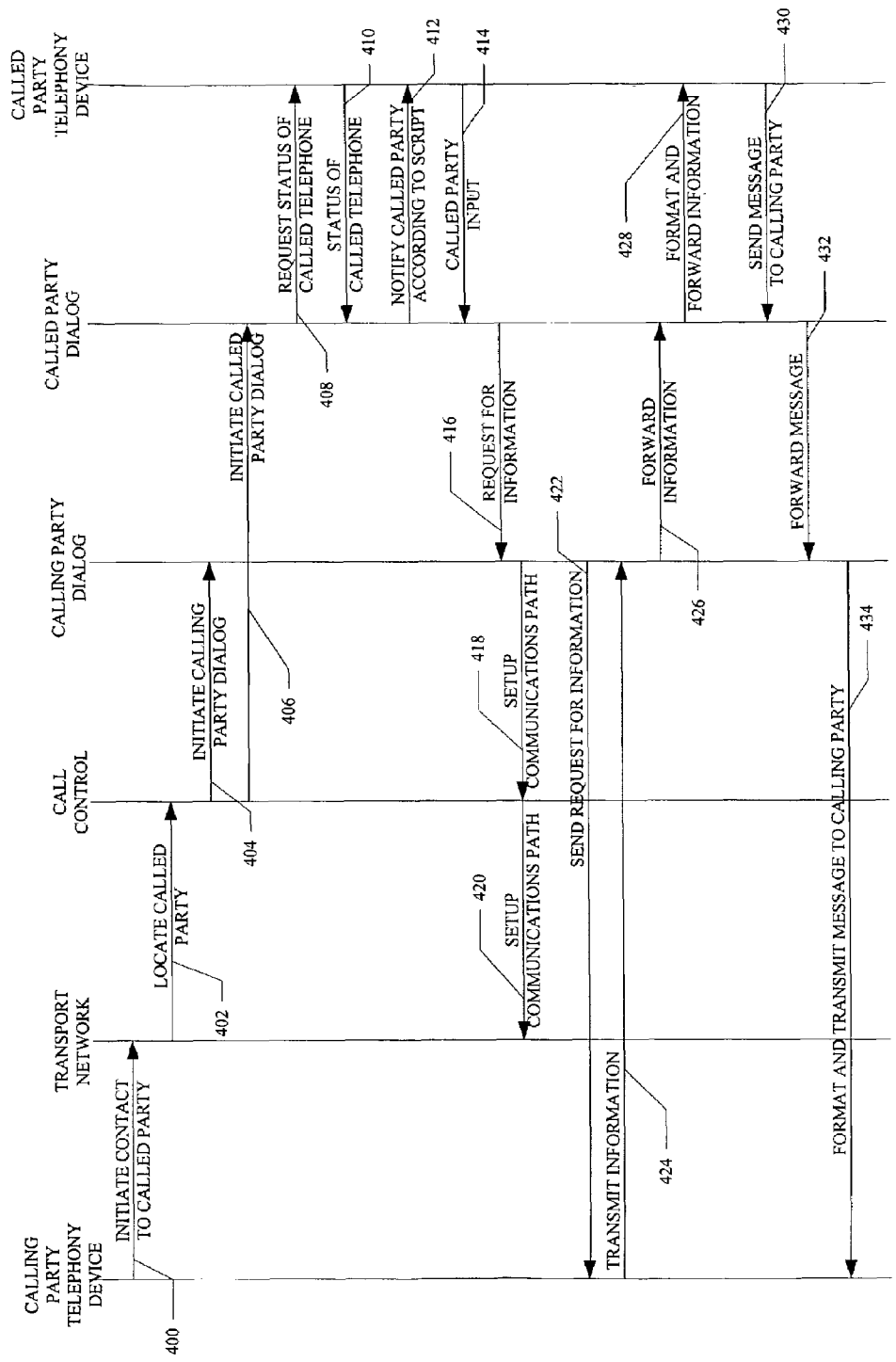
FIG. 4 is a further exemplary call flow diagram of the operation of the exemplary embodiment of this invention.

Turning to FIG. 4, a call flow diagram is shown, illustrating the call flow according to the third of the three scenarios presented above. A calling party initiates a call 400 at a calling party telephony device. The call is delivered to the transport network, which locates the called party 402.

The call initiation is passed to the call control device associated with the called party, which initiates a calling party dialog 404 and called party dialog 406. The called party dialog requests the status of the called telephony device 408, which is received in 410. The called party dialog notifies the called party telephony device according to a preprogrammed script 412. The called party provides input to the called party dialog 414. This input may be, in a simplistic example, "what does the calling party want?" The called party dialog receives the request, translates the request to usable form (e.g., automatic speech recognition, receiving data from a PC, etc.). The called party dialog passes the request for information to the calling party dialog 416.

In this example, the calling party dialog sets up a communication path to the calling party telephone device in order to obtain this information. To this end, calling party dialog requests a communication path be set up of the call control device 418. The call control device performs the necessary tasks (depending upon the communications network) and forwards the request to the transport network 420. The transport network sets up a communications path to the calling party telephone device and the calling party dialog sends the request for information to the calling party telephone device 422. This request may be in audible form (either recorded or text-to-speech), may be in short message form, email, etc.

The calling party transmits the information from his or her telephony device 424, which is received at calling party dialog. The message may be, for example, "where is the 2 o'clock meeting?" Calling party dialog forwards the information to the called party dialog 426. Called party dialog formats the information according to the calling party script and forwards the information to the called party telephony device 428.

In accordance with this example, the called party sends a short message to the calling party ("The meeting is in room 2A-402."). The called party sends the message from the telephony device or PC to the called party dialog 430. The called party dialog translates the message, if necessary (using, for example, automatic speech recognition) and forwards the message to the calling party dialog 432. Calling party dialog formats and transmits the message to the calling party 434. This step may comprise sending recorded speech, sending an instant message, sending email, etc. In this manner, the called party can dispose of the call in the most efficient manner without tying up telecommunications resources.

It is to be understood that the above-described embodiment is merely illustrative of the present invention and that many variations of the above-described embodiment can be devised by one skilled in the art without departing from the scope of the invention. For example, the transport network may be the PSTN, a signaling network, a data network such as the Internet, or a combination thereof. The telephony devices, as stated above, may be telephones, PC's, pagers, PDA's or a combination thereof. It is therefore intended that such variations be included within the scope of the following claims and their equivalents.

We claim:

1. A method for receiving an incoming call comprising:
   receiving the caller ID of the calling party and the status of a called party's telephony device, wherein the status of said called party's telephone device is either busy or not busy; and
   applying the caller ID and the status to a called party defined script to determine whether or not said called party is notified of said incoming call prior to call connection.

2. A method in accordance with claim 1 further including interacting with said called party to determine handling of said incoming call by presenting a plurality of options to said called party and receiving a selection of one of said plurality of options from said called party.

3. A method in accordance with claim 2 wherein said presenting a plurality of options comprises presenting said options to said called party audibly.

4. A method in accordance with claim 2 wherein receiving a selection of one of said plurality of options comprises receiving verbal input from said called party.

5. A method in accordance with claim 2 wherein presenting a plurality of options comprises presenting said options to said called party visually.

6. A method in accordance with claim 5 wherein said plurality of options are visually presented on a display on a telephony device.

7. A method in accordance with claim 5 wherein said plurality of options are visually presented on a computer screen.

8. A method in accordance with claim 5 wherein receiving a selection of one of said plurality of options comprises receiving input from a keyboard from said called party.

9. A method in accordance with claim 8 wherein receiving input from a keyboard comprises receiving dual-tone, multi-frequency input.

10. A method in accordance with claim 8 wherein receiving input from a keyboard comprises receiving input from a computer keyboard.

11. A method in accordance with claim 1 further comprising:
    requesting further information from a calling party.

12. A method in accordance with claim 11 further comprising:
    delivering said further information from said calling party to said called party.

13. A method in accordance with claim 12 wherein said delivering comprises audibly informing said called party of said further information.

14. A method in accordance with claim 12 wherein said delivering comprises visually informing said called party of said further information.

15. A method in accordance with claim 1 further including said called party delivering a message to said calling party.

16. A method in accordance with claim 15 wherein said message is delivered audibly.

17. A method in accordance with claim 15 wherein said message is delivered visually.

18. A method in accordance with claim 1 further comprising:
 spawning a calling party process to interact with said calling party; and
 spawning a called party process to interact with said called party, wherein said calling party process and said called party process effect communication between said calling party and said called party without a connection being set up between the calling party and the called party.

19. A method in accordance with claim 1 wherein the caller ID, the status, and the time of day are applied to a called party defined script to determine whether or not said called party is notified of said incoming call prior to call connection.

\* \* \* \* \*